(12) United States Patent
Violette et al.

(10) Patent No.: US 7,338,062 B1
(45) Date of Patent: Mar. 4, 2008

(54) SWIVELLING EXTENDER TOW HITCH AND METHOD OF CENTERING AND LOCKING SAME

(76) Inventors: Richard Violette, 85 Old Belgrade Rd., Augusta, ME (US) 04330; Randy Violette, 23 Pheasant Run, Belgrade, ME (US) 04917

(*) Notice: Subject to any disclaimer, the term of this patent is extended or adjusted under 35 U.S.C. 154(b) by 336 days.

(21) Appl. No.: 11/029,530

(22) Filed: Jan. 5, 2005

(51) Int. Cl.
*B60D 1/40* (2006.01)
(52) U.S. Cl. .................. 280/478.1; 280/489; 280/488
(58) Field of Classification Search ............. 280/478.1, 280/489, 488
See application file for complete search history.

(56) References Cited

U.S. PATENT DOCUMENTS

| | | | | |
|---|---|---|---|---|
| 4,951,957 A | * | 8/1990 | Gullickson | 280/479.2 |
| 5,277,447 A | * | 1/1994 | Blaser | 280/479.2 |
| 5,322,315 A | * | 6/1994 | Carsten | 280/479.2 |
| 5,547,210 A | * | 8/1996 | Dugger | 280/477 |
| 6,527,292 B2 | * | 3/2003 | Adair | 280/491.3 |
| 6,722,380 B1 | * | 4/2004 | Hafer | 135/16 |
| 2003/0218314 A1 | * | 11/2003 | Moss | 280/491.1 |

* cited by examiner

*Primary Examiner*—Lesley D. Morris
*Assistant Examiner*—Marlon Arce-Diaz

(57) ABSTRACT

A tow hitch for a vehicle with adjustments which simplify the coupling process. During coupling a draw bar, slideably positioned in a housing pocket, is afforded continuous adjustment latitude in both a left to right and front to back arc. Even if the vehicles are coupled at an angle, guide pins, confined by openings in the housing, move with the bar and respond to vehicle movement for an aligned locking and tow. An automatic locking pin secures the tow hitch, and a detector device detects the proper coupling.

18 Claims, 4 Drawing Sheets

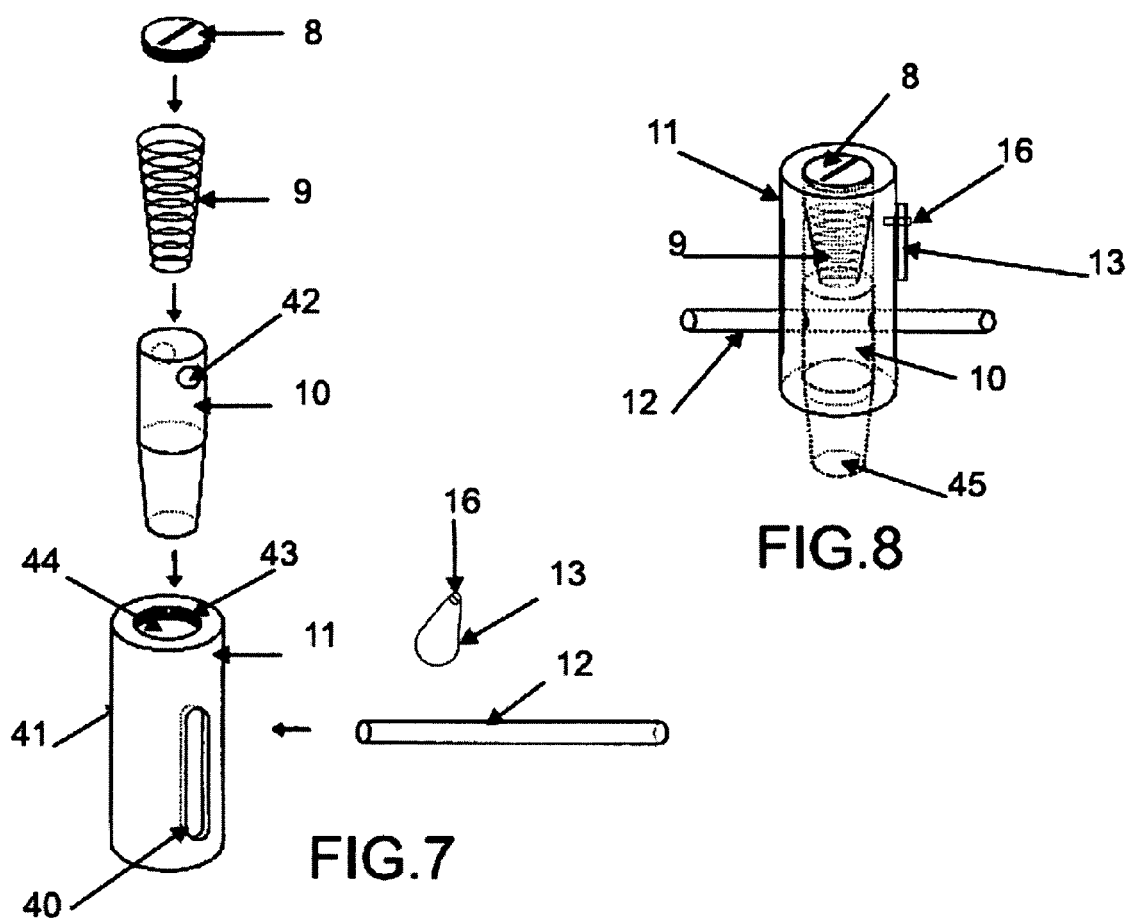

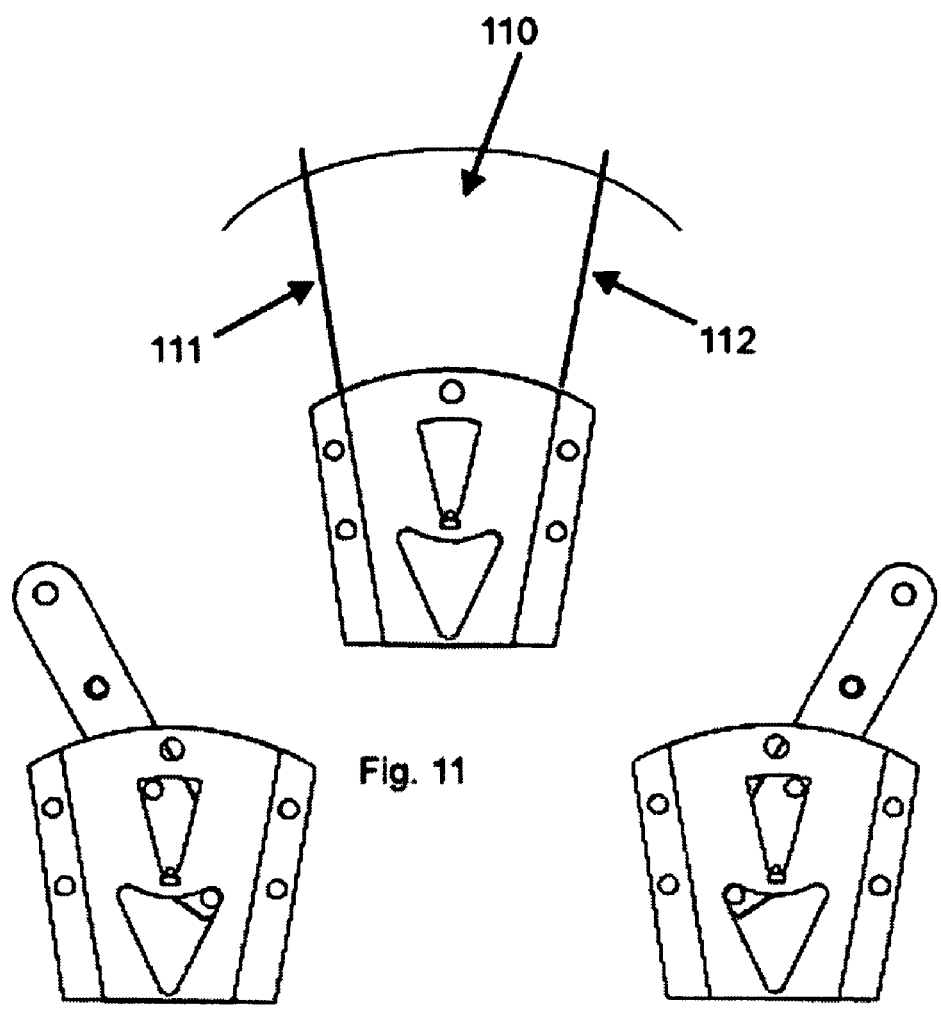
Fig. 11
FIG.10A
FIG.10B
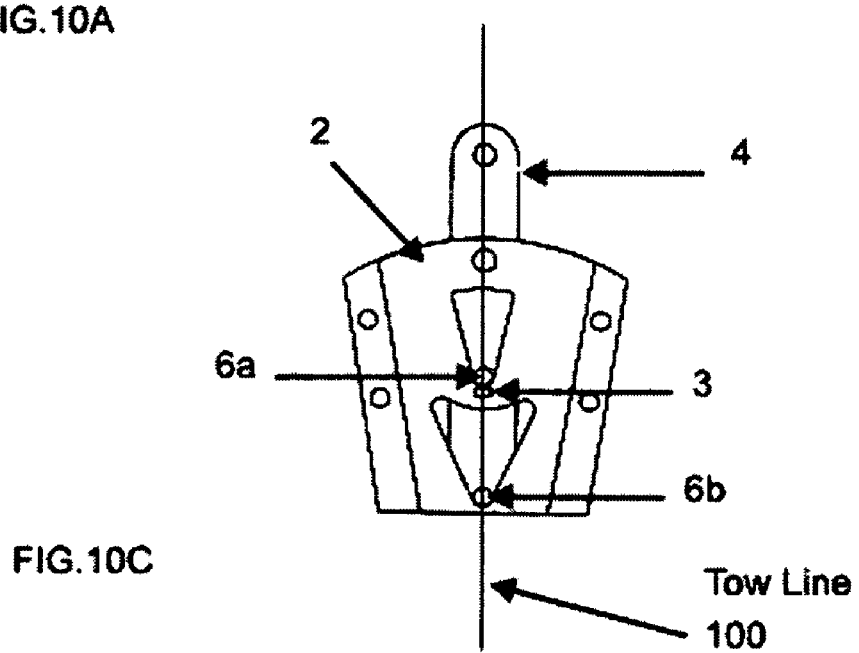
FIG.10C
Tow Line
100

SWIVELLING EXTENDER TOW HITCH AND METHOD OF CENTERING AND LOCKING SAME

BACKGROUND OF THE INVENTION

1. Field of the Invention

This invention relates to vehicle towing apparatus and methods for same. More specifically, the field of this invention relates to a steel hitch at the tow vehicle that will extend, swivel and automatically lock the towed and towing vehicles together in a simple and efficient manner. Additionally the field of this invention relates to a simple interchangeable draw bar that can be interchanged from ball to pintle or similar type coupling mechanisms for towing purposes.

Explanation of Terms

Set out below are brief descriptions of certain relevant terms which further the understanding of the invention. These terms provide a basis for a detailed teaching of the improvements of this invention in the relevant arts. Such terms are not intended to replace the claims but rather serve as helpful guides in understanding our novel improvements in these arts.

Centering Draw Bar

Towing is accomplished by a steel draw, pull or tow bar that has at its exposed end an opening for receiving a coupling device such as a ball/socket or a pintle hook. (See below.) The invention draw bar has four aligned openings with the tow-securing apparatus (whether drop socket or pintle) at the exposed rearmost position. The other three aligned openings in the draw bar receive, in order, a locking pin and a pair of movement control guide pins. The draw bar is moveably pinned to swing in an arc left to right, slide forward and back while being automatically lockable and manually releasable as desired.

Coupling Between Tow and Towed Vehicles

A ball and "lift and drop" coupling socket has the receiving socket on the to-be-towed ("towee") vehicle and the ball on the towing vehicle. A pintle lock type has both ball and socket on the tow vehicle and is self closing upon contact with a receiving ring or opening on the to-be-towed vehicle. In the latter event, the receiving opening—say a steel ring on the towee vehicle is large enough in diameter and sturdy enough that contact with the pintle hook at the exposed end of the bar will allow the ring to drop over the pintle hook ball. Such pintle hooks are well known and many examples may be found that explain and depict them. For example, in the 2004 Issue of Northern Hydraulics at Catalog page 220 five different models are shown together with the flat steel adapter. In either event, however, the coupling end of the draw bar becomes selectively fastened to the receiving apparatus on the towee vehcile.

Adjustable Hitch Housing

A hitch housing for the tow provides limited and unique arc and extending/retracting freedom of movement for the draw bar during the coupling process. Movement control pins, once inserted via the top cover and retaining the draw bar within a pocket in the housing, are guided within confines established by a pair of aligned housing openings in the bottom cover. Together the pins and openings allow the draw bar a limited and unique freedom of movement that permits easy centering and automatic coupling between the tow and a towed vehicle.

Draw Bar Housing Openings

Two pins within the housing are located with side to side and back to front movement in a pair of housing openings. Taking the rear end of the tow vehicle as a reference point, the rearmost opening is a smaller triangular-shaped "piece-of-pie" opening; whereas the larger front opening is essentially a smooth heart-shaped opening. These openings have their points aligned along the center, or tow line, of the hitch for advantageous locking and movement purposes. The arc of the rear opening defines the amount of swivel and acts as a side to side pin guide. The arc at the base of the rear opening is matched by a reversed direction arc that forms the dip of the heart shaped front opening. Movement control pins trace out a pattern of movement within these housing openings in order to accomplish the novel features of this invention.

Automatic Locking Pin

A third opening in the housing is located at the extreme front end of the mounting plate. This locking pin opening is aligned with the points on the pie and heart shaped freedom-of-movement openings. Housed in the locking pin opening is a raised spring loaded taper pin that has a cross piece for manually lifting upon a coupling release. And, the taper pin acts as a detent which, being spring loaded, drops into a receiving opening in the draw bar for automatic locking purposes. Made of cold rolled steel, it is strong to bear the tow load.

2. Description of Prior Art

Towing hitches are, of course, well known. Also well known is the great difficulty in aligning the tow ball and the receiving socket, or cap, between the towing vehicle and the towed vehicle. Whether it is a pickup truck and a boat trailer, or a semi-sized RV and the trailing auto to be towed along behind the RV, such alignment poses severe problems for many people. A successful coupling of the two vehicles is normally a series of driver back and forth and turning right, turning left, inching forward and jerking back.

To add to the problem, these are mostly blind movements while someone else, in an almost equally blind and potentially dangerous position, tries to signal the desired movements necessary for a successful coupling to take place. Further still, there are also height adjustments needed along with the arc and back and forth in plane movements.

Highly summarized, a successful coupling between the two vehicles may generally be summarized as a frustrating and stress raising situation. In the RV world especially, men or women drivers being what they are, husband and wife both dread this connecting process.

Then, one must also add to the frustration, the weight of the towed vehicle. Take, for example, a boat on a trailer. Generally speaking after a try or two by the driver of the towing vehicle, the tow ball is only slightly off line, but the weight of the to-be-towed vehicle prevents manual movement as needed for an easy and successful coupling of the two vehicles.

Commercial sized vehicles have such a bulk and mass of steel that they often must use additional leverage provided by hydraulic rams or the like during the process of coupling together such very large vehicles. They are today a size once thought not possible. Yet such vehicles must still be connected together by some form of a tow hitch. It is a serious problem that, prior to the advent of this invention, remained unsolved.

This invention presents novel operational principles that are equally applicable to today's gigantic-sized earth moving equipment as it is to pickup trucks and boat trailers. Farm implements, bulldozers, excavators are among the many vehicles which will greatly benefit by the novel features presented herein.

In general then, what has not yet been provided, in order to fill a long sought for need, is a flexible, easy apparatus and method for connecting a tow hitch between vehicles. The invention provides a novel solution to this long sought for need by featuring a limited but highly successful freedom of movement in a confined amount of swivel and back/forth adjustments with automatic locking and manual dis-engagement to boot.

SUMMARY OF THE INVENTION

In the invention, a tow system is disclosed that has limited but highly beneficial movement during the coupling process between the tower and the towee vehicles. Such movement is provided by a novel dual plate mounting system on the tow side for housing a draw bar that adjusts in swivel and front to back during the centering process until the proper coupling position is achieved. Even when coupled at an angle (easily possible with this invention) our guide pins align the tow bar for coupling as vehicle movement takes place. Relative vehicle also locks the two vehicles movement together as well.

Attached to the housing and positioned above the draw bar is an automatic locking pin which is activated simply by vehicle movement during the initial start of the towing process. A signaling device detects the proper coupling and issues a signal to the driver of the tower vehicle as to the status of the coupling.

Achieved by this invention are some of the following features and benefits:

Sturdy and position adjustable during coupling.
Readily interchangeable with diverse hitch types.
Easy to center during coupling movements.
Provides an automatic locking pin.
Self locking pin responsive to vehicle movement.
Safety lock for once coupled and locked hitch.
Guide pins which facilitate hitching and locking movements.
Durable pin strength during primary towing.
Guide pins that are readily receptive of a ram assist for large heavy duty situations.
Wide range of adjustment zone during coupling.
Manual disengage of locked position.
Vehicle movement both self aligns and locks the hitch.

DRAWINGS

FIG. 7 is an exploded view of the automatic locking pin in accordance with the invention;

FIG. 8 shows the components of FIG. 7 in assembled condition;

FIG. 10 includes three side by side bottom views depicting the draw bar movements for ease of coupling during a hitch; and FIG. 11 shows a shaded area depicting the range of adjustment provided by the invention during a hitching process.

DETAILED DESCRIPTION OF THE PREFERRED EMBODIMENT

Figure 1:
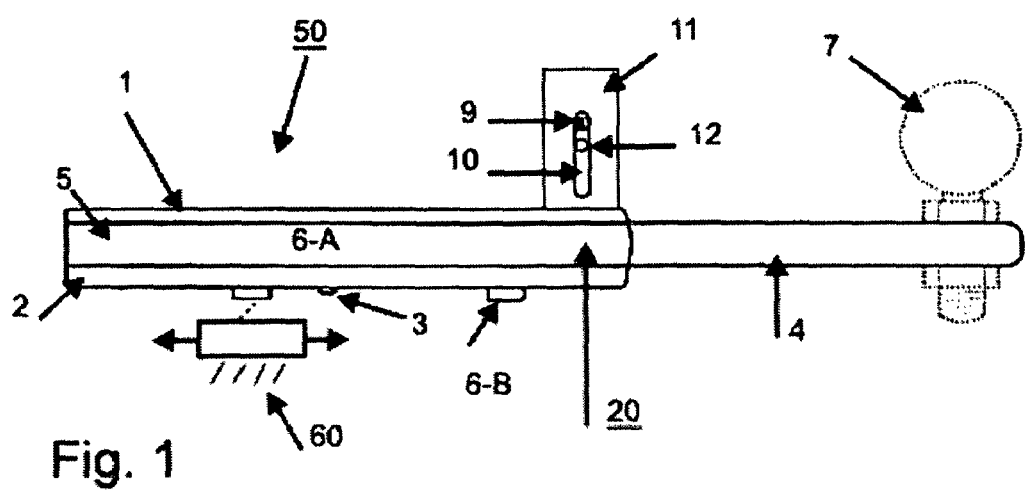
FIG. 1 is a side view with the draw bar extended in accordance with the invention.
Figure 5:
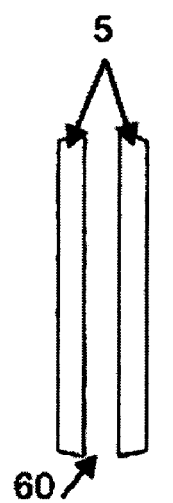
FIG. 5 is a side view of the side spacer plates that defines and forms the housing adjustment pocket as shown in FIG. 3.

FIG. 1 depicts a side view of our hitch 50 wherein a housing 20 has a top plate 1, bottom plate 2 and a pair of side filler plates 5 forming an interior pocket (shown dashed in FIG. 2, solid in FIG. 3 and designated by space 60 in FIG. 5) for draw bar 4 in housing 20 of FIG. 1. Hitch 50 is fastened to the rear frame of a tow vehicle in any conventional manner such as a custom receiver.

At the remote end of bar 4, FIG. 1, is a ball 7 (shown dashed since it is only one of several well known coupling devices such as the aforesaid pintle hook). One would have several draw bar types which may easily be interchanged within the principle of this invention. And, other coupling and securing types between the two vehicles may, of course, be used.

Figure 9:
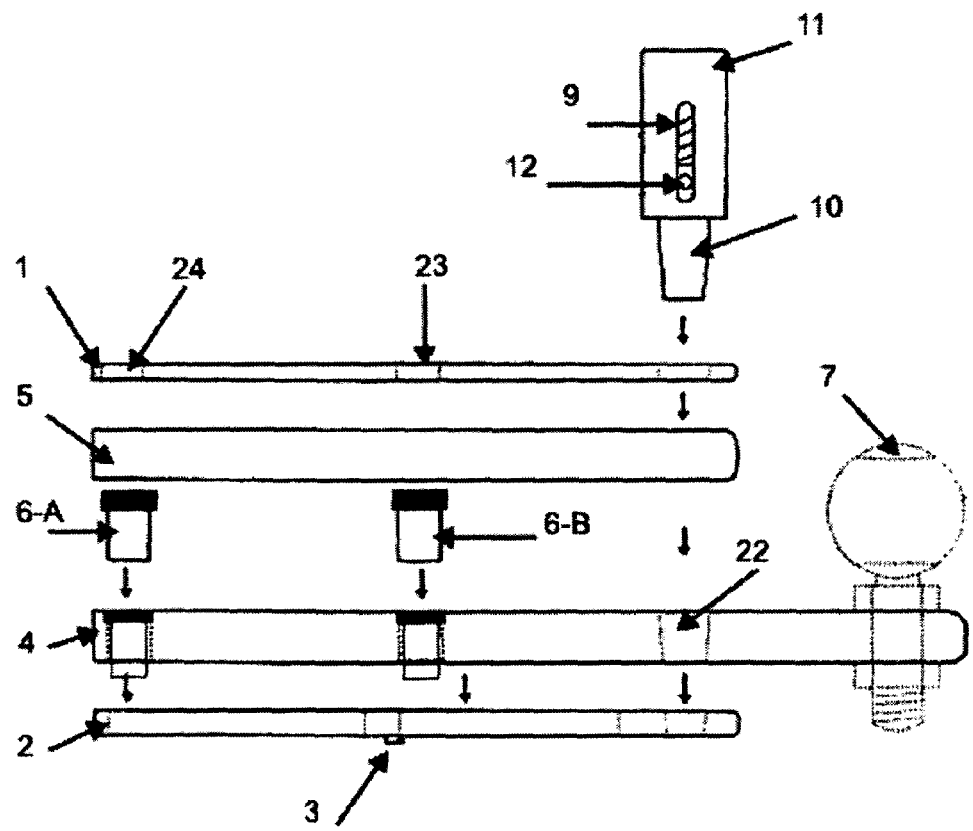
FIG. 9 is a side view in exploded form showing the assembly of the tow hitch of the invention.

Centrally located in housing 20 of FIG. 1, draw bar 4 moves around in the pocket 60 (FIGS. 2 and 3) in a manner to be described in detail hereinafter. Also depicted In FIGS. 1 and 10 is a pair of guide pins 6A and 6B. FIG. 9 is an exploded view that amply demonstrates that these pins 6 have collars 66 (see FIG. 6) that are seated in recessed holes in the top of draw bar 4. The thickness of the side plates 5 (FIG. 5) and the draw bar 4 are chosen such that draw bar 4 can smoothly slide within the pocket 60 formed for it by housing 20.

At the forward end of the housing, we have placed an automatic locking device 11. This locking device 11 is shown in more detail in FIGS. 7 and 8 and will be described further in conjunction with those figures. Briefly, however, the locking device 11 includes a tapered pin 10 (FIG. 9) that is spring loaded and rides along on the upper surface of moveable draw bar 4. The smaller tapered end of the locking pin, is urged by the spring 9 into the locking hole 22 of draw bar 4 when both are properly positioned for locking as will be described in more detail later on.

Figure 2:
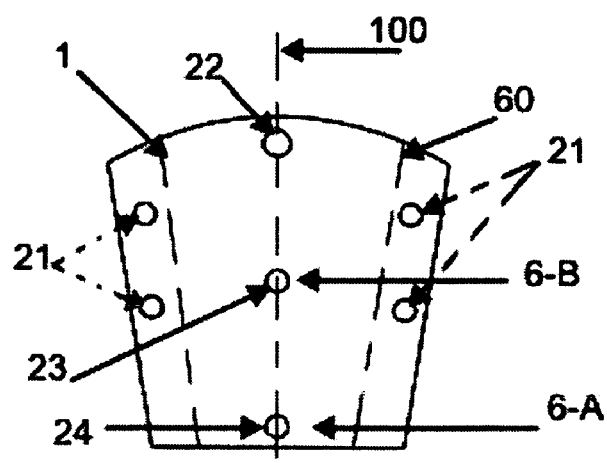
FIG. 2 shows a top view of a mounting housing plate with a pocket in dashed lines.

FIG. 2 depicts the top plate 1 of housing 20. The two pairs of openings 21 represent the means for fastening the housing to the vehicle frame or custom receiver. These may be screws, bolts, welds or the like for the steel hitch 50. Also note that top plate 1 includes, running from the arched front to back, three centrally located holes 22, 23 and 24 through top cover plate 1. These holes are in alignment with the direction of tow 100 (FIG. 10C).

First opening 22 may be threaded or otherwise fashioned to retain the housing of automatic locking device 11, FIG. 1, while allowing the spring loaded end of the locking pin 10 to ride on the upper surface of the draw bar 4. The next two openings, 23 and 24, allow the guide pins 6A and 6B of FIG. 6 to be inserted into the draw bar 4 through the top cover 1. Once inserted, guide pins 6A and 6B remain in place and extend through the adjustment openings 25 and 30 of bottom plate 2, FIG. 3.

Figure 3:
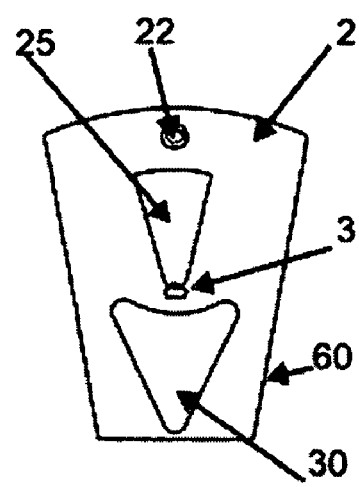
FIG. 3 depicts a view of a housing pocket on the parallel bottom mounting plate having draw bar movement capability in accordance with the principles of this invention.
Figure 4:
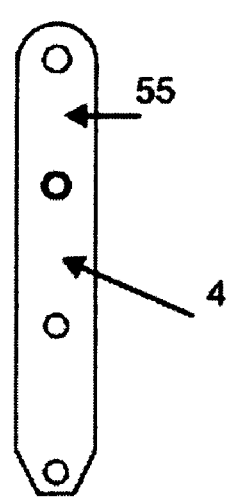
FIG. 4 is a top view of a draw bar of the invention.

Turning now to FIG. 3, please note that the two adjustment openings 25 and 30 are in line with opening 22. The first opening 25 is essentially triangular with a shape like a piece of pie in that it has a slight rounded arc at its base.

Second opening 30 is essentially a smooth heart shape with the top of the heart having an arc that is reversed in contour from the arc of opening 25.

Figure 6:
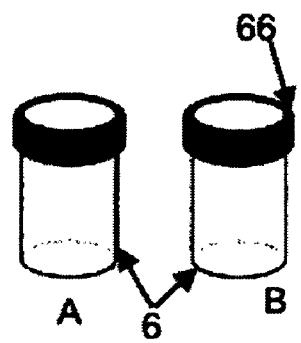
FIG. 6 is a top perspective of a pair of guide pins with collars.

These openings 25 and 30 receive the pins 6 which protrude slightly from the bottom of plate 2 as shown in the side view of FIG. 1. FIG. 6 shows the pins 6 alone. When these pins 6 are dropped through openings 23 and 24 of top plate 1, their collars 66 settle into recesses of appropriate depth so that the top surface of bar 4 is flush.

FIG. 9 depicts, in exploded view the top collars 66 on pins 6 and the manner in which they drop into the mating-sized recesses in the top of draw bar 4. FIG. 9 also makes clear that the openings 23 and 24 in top plate 1 are slightly oversized so that the collars 66 of pins 6 may be inserted into draw bar 4.

If the user desires to change a coupling type, the user simply moves bar 4 until all three pins are aligned with the openings in both housing covers, and removes the pins from their position of support by the tow bar 4. After withdrawing the first bar, the user may next insert a new draw bar. This second draw bar may have, say, a pintle hook in place on the exposed end of draw bar 4. Reinserting the guide pins 6 with the new bar in place completes the coupling type change.

Note in FIG. 1 that the rear pin 6A is longer than the front pin 6B and that its lower end protrudes an inch or so from the bottom surface of plate 2. That protrusion allows an eye-type fastener from a ram 60 (shown symbolically by a double headed arrow) to be connected to rear pin 6 when the invention is applied to large commercial vehicles. Ram 60 is anchored to the frame and, being bi-directional, drives the draw bar 4 in movements, as needed, for a proper coupling. This described use and control of hydraulic or electric rams, especially in connection with desired movement in heavy and bulky situations, is well known. Thus, it is believed that no further description is needed.

FIG. 10 includes FIGS. 10A, 10B and 10C which are bottom views that show the freedom of movement of the draw bar 4 in the plane of the pocket 60 in housing 20. FIG. 10 also shows the detector 3 for determining the status of the coupling. Detector 3, for example, would be viewed from the inside the tow vehicle to determine when a complete coupling has been achieved. A light inside the vehicle will shine green for "go" and red for "not yet properly coupled". Such technology is well known and thus no further description is believed necessary.

FIG. 7 shows an exploded view of our automatic locking feature provided by pin 11. In FIG. 7, a hollow cylindrical housing 41 is presented for receiving in turn, a tapered locking pin 10, a spring 9, and a keeper screw 8. Housing 41 has a pair of opposed in line longitudinal slots 40 through the cylindrical side wall. Likewise taper pin 10 has a pair of opposed in line openings 42 there through.

As shown best in the assembled view of FIG. 8, rod 12 is secured in the slot pair and also through the openings 42 in tapered locking pin 10. Rod 12 allows the user to lift up pin 10 and thus manually disengage the automatic locking feature.

Keeper 8 may be threaded into mating threads 43 in the open end 44 at the top of cylindrical housing 41. Once assembled, with keeper 8 screwed in place, the taper end 45 of locking pin 10 will ride along on the upper surface 55 of draw bar 4 as bar 4 is moved around during the coupling process.

Draw bar 4, as shown best in FIG. 9, also has a slightly oversized top opening 22 relative to the bottom 45 of locking pin 10 That opening is essentially matched to the taper of locking-pin 20. Pin 10 will readily be urged by spring 9 into and fill opening 22 when the two are properly aligned.

Once locked, however, the movement of the coupled vehicle will cause bumps and wave-like actions by, stops, turns, towing and the like. Such movement might tend to unseat the taper pin 10 from its locked position. Accordingly, we have added a pendulum safety catch 13, FIG. 7, which is free to swivel about screw 16 in the housing 20. Note how safety catch 13, FIG. 7, is more heavily weighted at the bottom so that gravity will aid it and cause catch 13 to drop into a safety catch position.

FIG. 10 includes FIG. 10C which shows that all three pins, the two guide pins 6 and the locking pin 12, are in line for a tow along tow line 100. When seated correctly, pin 12 locks automatically and distributes the shocks and give and take of a tow load. Comparison of FIG. 10A with FIG. 10B shows the extreme right and left swings for the extended draw bar 4

In order to activate the automatic locking feature, one simply couples the two vehicles—a lot easier and less frustrating task with this invention and its coupling adjustment range of FIG. 11, and moves the tow vehicle. Relative movement between the two vehicles causes the guide pins to move within the two openings 25 and 30 As the guide pins trace their location to the point positions, the draw bar opening 22, FIG. 9, moves under the tapered pin 10 and it drops into place. An indication by detector 3 would signal that a valid coupling has been achieved.

Note that it is the fan shape of the housing together with the guide pin control openings that allows a continuous and smooth movement of draw bar 4 into the locked position. Likewise, FIG. 11 shows in a dotted grid 110 between lines 111 and 112 an indication of the range of adjustment for the given proportion of draw bar 4 and housing 20. Modifications to those proportions, of course, will still be within the principles of our invention but will vary that adjustment area.

While our invention has been described with reference to particular examples of some preferred embodiments, it is our intention to cover all modifications and equivalents within the scope of the following claims. It is therefore requested that the following claims, which define our invention, be given a liberal interpretation commensurate with our contribution to the relevant technology.

What is claimed is:

1. A vehicle towing hitch with a housing having a cover and a tow bar with a locking pin and a coupling device fastened at the exposed end of the bar for coupling the tow vehicle to another vehicle, said towing hitch comprising:

an unpinned draw bar moveably positioned in a pocket in the housing, which bar has a pair of aligned openings for supporting movement control guide pins;

coupling adjustment openings in said cover of said housing and in contact with said movement control pins for allowing non-pinned side to side and back and forward movement of said draw bar during a coupling process;

said movement control guide pins being positioned in the draw bar itself and guided within said pair of coupling adjustment openings in said cover to allow the bar to swing in a confined arc both left to right, and forward and back during said coupling process; and said locking pin on said housing is automatically engaged with said draw bar and lockable therewith in response to vehicle movement.

2. The apparatus in accordance with claim 1 wherein said housing comprises:

cover means forming said housing pocket;

said coupling adjustment openings located in said housing cover means;

said control guide pins are restricted within movement confines established by the shape of said coupling adjustment openings.

3. The apparatus in accordance with claim 2 wherein said coupling adjustment openings further comprises:

a pair of shaped openings in said housing cover means, which openings continuously steer the guide pins in a limited freedom of movement that permits both centering and automatic coupling between a tow and a towed vehicle; and detector means responsive to aligned positioning of said guide pins and said locking pin for confirming a proper coupling of said hitch.

4. The apparatus in accordance with claim 3 wherein said guide pins further comprise:

a pair of guide pins, one each in one each of said pair of shaped openings that permit side to side and back to front movement of said bar.

5. The apparatus in accordance with claim 4 wherein said shaped openings further comprise:

a first opening in the shape of arc-based triangular ("piece-of-pie");

a second larger opening in the shape of a smooth heart with a smooth reverse top arc;

both of said openings each have points aligned along a center tow line for the hitch.

6. The apparatus in accordance with claim 5 wherein, for advantageous locking and movement purposes, said hitch further comprises:

said first shaped opening is next to the exposed end of the draw bar and said second opening is rearward of the first opening;

an arc at the base of said first and second openings defines the amount of swivel of said bar left to right and the sides of said opening control the amount of front to back movement of the draw bar.

7. The apparatus in accordance with claim 5 wherein, for advantageous locking, said hitch further comprises:

a third locking pin opening aligned with the points on the pie-shaped and heart shaped openings in said draw bar;

a tapered locking pin;

means spring loading said tapered locking pin; and said locking pin acts as a detent which, being spring loaded, rides along the upper surface of said draw bar during adjustment movements of said draw until urged into said locking pin opening for automatic locking.

8. The apparatus in accordance with claim 7 wherein said automatic locking for said hitch further comprises:

an open cylindrical housing having a longitudinal slot therein for said locking device;

said locking pin being cylindrical and riding within said cylindrical housing;

means positioning said spring loading above said locking pin;

a manually operable lifting rod fastened to said locking pin and positioned in said slot; and a safety catch moveable into contact with said rod for preventing the accidental disengagement of said locking pin during vehicle movements experienced during towing.

9. The apparatus in accordance with claim 8 wherein said detector for said hitch further comprises:

a contact switch positioned in alignment with the points of said openings in said draw bar and responsive to contact with one of said guide pins for confirming a proper hitch between the vehicles.

10. The apparatus in accordance with claim 1 wherein said support for said locking pin by said tow bar further comprises:

the upper surface of said draw bar whereby the locking pin rides on that surface until the locking pin opening is aligned under the locking pin for automatic locking.

11. The apparatus in accordance with claim 10 wherein said hitch further comprises:

an arc at the base of the second opening which arc is matched by a reversed direction arc that forms a smoothed dip at the top of the heart-shaped second opening; and further wherein said pair of guide pins, following the arcs and the sides of said pair of openings, traces out an adjustability range of movement for the coupling end of the draw bar which facilitates hitching of said bar between the vehicles.

12. A method of vehicle towing by a hitch having a tow bar with a coupling device fastened at the exposed end of the bar for coupling the tow vehicle to another vehicle, which method comprises the steps of:

positioning a draw bar in a pocket in a housing, which housing is adapted for placement on a tow vehicle;

adapting the tow bar with movement control guide pins which are carried by the draw bar; and placing, in a cover forming the housing, shaped openings which engage the guide pins with a freedom of movement that permits the tow bar to move during a coupling procedure both in a side to side and front to back direction.

13. The method in accordance with claim 12 and comprising the additional step of:

continuously and smoothly allowing said bar to move in said housing pocket while confining the movements of said guide pins by said shaped openings in said cover.

14. The method in accordance with claim 13 and comprising the additional step of:

allowing the bar to swing in an arc left to right, and forward and back during a coupling process.

15. The method in accordance with claim 12 and comprising the additional steps of:

activating a locking pin only when said hitch is in a tow line:

detecting an aligned positioning of said guide pins in said tow line; and confirming by said detecting step that a proper coupling of said hitch has taken place.

16. The method in accordance with claim 12 and comprising the additional steps of:

housing a locking pin in an open cylindrical housing having a longitudinal slot therein for a cylindrical locking device which rides within said cylindrical housing;

spring loading said locking pin; and installing a safety catch preventing the accidental disengagement of said locking pin during vehicle movements experienced during towing.

17. The method in accordance with claim 16 wherein said locking step further comprises:

positioning a contact detector switch in alignment with the points of said openings in said draw bar; and activating said detector only in response to movement of said guide pins into a proper position to confirm a completed hitch between the vehicles.

18. A vehicle towing hitch with a housing having a tow bar with a coupling device fastened at the exposed end of the bar for coupling the tow vehicle to another vehicle, said towing hitch comprising:

- a draw bar moveably positioned in a pocket in the housing, which bar has a plurality of aligned openings for receiving a locking pin and for providing freedom of movement for control guide pins;
- said locking pin is automatically engaged with said draw bar and lockable therewith in response to vehicle movement at a tow line;

said housing comprises:

cover means forming said housing pocket;

openings located in said housing cover means;

said movement control guide pins are restricted within confines established by the shape of said openings; and said guide pins allow the bar to freely swing in an arc left to right, and forward and back during a coupling process.

\* \* \* \* \*